United States Patent [19]
Erikson

[11] 3,820,290
[45] June 28, 1974

[54] METHOD FOR THE RAPID CURE OF CONDENSATION POLYMERS AND PRODUCTS RESULTING THEREFROM

[75] Inventor: Leslie E. Erikson, Holden, Mass.

[73] Assignee: Norton Company, Worcester, Mass.

[22] Filed: Oct. 7, 1970

[21] Appl. No.: 78,973

[52] U.S. Cl............................ 51/298, 260/37, 260/38
[51] Int. Cl.............................................. C08g 51/12
[58] Field of Search........ 51/298; 260/38, 844, 851, 260/856, 857 PI, 873, 874

[56] References Cited
UNITED STATES PATENTS

| | | | |
|---|---|---|---|
| 2,959,474 | 11/1960 | Daniels et al. | 51/298 |
| 3,058,844 | 10/1962 | Johnson et al. | 260/844 |
| 3,173,889 | 3/1965 | Sylvester et al. | 260/844 |
| 3,280,217 | 10/1966 | Lader et al. | 260/844 |

Primary Examiner—Donald J. Arnold
Attorney, Agent, or Firm—Arthur A. Loiselle, Jr.

[57] ABSTRACT

Condensation polymers which generate by-products containing hydroxyl or amine radicals are cured rapidly and essentially free of voids and other defects generally resulting from such usually volatile by-products. This improvement is such cured condensation polymers is facilitated by incorporation therein of specified amounts of a non-cross linked polymeric organic acid anhydride which reacts with the hydroxyl or amine containing condensation by-product and likely with the condensation polymer itself, without any significant deleterious side effects such as plasticization or a reduction in the thermal resistivity of the cured condensation polymer.

13 Claims, No Drawings

METHOD FOR THE RAPID CURE OF CONDENSATION POLYMERS AND PRODUCTS RESULTING THEREFROM

BACKGROUND OF THE INVENTION

The invention relates to thermoset condensation polymers which upon curing generate an hydroxyl or amine radical containing by-product such as ammonia, water, alcohol, or amine. More particularly, the invention relates to a method of curing or cross-linking such condensation polymers and the resultant final product.

Condensation polymers are those polymers which are formed through a reaction between two or more dissimilar monomers or through a relatively low molecular weight prepolymer, the reaction generating a by-product which is a comparably simple molecule such as water, ammonia, an alcohol, or an amine. The condensation polymers of prime commercial importance are phenol-aldehyde, urea-aldehyde, aniline-aldehyde, melamine-aldehyde, saturated polyester, polyimide, and polybenzimidazole. All of the aldehyde containing prepolymers produce water or ammonia as a by-product of the curing reaction. Polybenzimidazoles are known which generate water and/or an alcohol on curing. Polyimides will generally produce phenol and/or an alcohol upon further processing to an infusible, insoluble final product. The saturated polyesters generate water as a by-product.

The commercial importance of these condensation polymers is well known and amply evidenced by the vast number of products and devices which are fabricated from these materials. Whenever there is a need for a polymer which possesses any combination of high mechanical strength, thermal stability, and chemical resistance, it is usually a condensation polymer that ultimately satisfies these requirements. These polymers are generally used in combination with other materials such as fillers or modifiers, and are found in a great variety of applications ranging from industrial thermosetting adhesives to household articles such as table ware and electrical outlets, to ablative shields for rockets and space re-entry vehicles.

They can be compounded with an almost infinite variety of relatively inert filler materials, the selection of which is generally based on the end use of the product being fabricated and cost. If the end product requires a high modulus of elasticity and optimum thermal properties, then inorganic fillers such as particulate asbestos, silica, silicon carbide, aluminum oxide, boron nitride, chopped glass fibers, and the like are incorporated therein. If the final product should be heat conductive then metal fillers like particulate aluminum, copper, and iron are the filler materials selected. For other applications fillers such as woodflour, cloth, glass cloth, synthetic fiber cloth, or carbon are compounded with the polymer.

A specific product type which utilizes a large quantity of condensation polymer is the grinding wheel. This product uses, for the most part, phenol-formaldehyde, saturated polyesters, polyimides, and polybenzimidazoles, the latter two polymers being used in relatively small quantities at the present. In a grinding wheel the polymer, which may or may not contain finely comminuted fillers, is employed to hold or bond together abrasive particles in a desired configuration.

At first glance a grinding wheel would hardly seem to have much common with a phenolic resin coffee percolator handle, yet they are inherently very similar. Both are constructed from a condensation polymer and a filler. In the grinding wheel the abrasive, although it serves another function, also behaves in a manner similar to that of a filler. There is a wide variety of abrasives employed e.g., diamond, cubic boron nitride, silicon carbide, aluminum oxide, aluminum oxide-zirconium oxide, silica (sand, emery, quartz, etc.), magnesia spinel, magnesia spinel-zirconium oxide, and the like. In addition as mentioned above, grinding wheels may contain filler in the more conventional sense of the term. These fillers are seldom incorporated in a grinding wheel for the sake of extending the polymer as is frequently the case in the manufacture of other condensation polymer bonded products. In a grinding wheel the fillers are most commonly used to impart some desired grinding characteristic. Typical of such reactive fillers, as they are called in the grinding wheel industry, are potassium fluoro borate, sodium fluoro aluminate, barium sulfate, iron sulfide, calcium oxide, and the like.

The fabricator of condensation polymer containing products has, since the advent of such polymers, been plagued by one problem inherent in these systems viz., the by-product of condensation or polymerization which almost always is carried out at elevated temperatures, making such by-products volatile. The most common, and most troublesome by-products, are ammonia and water. Generally optimum properties are attained when the polymer is cured or cross-linked to its maximum cross-linked density. The greater the degree of cross linking, which must be accomplished by relatively high processing temperatures, the greater is the amount of water vapor and/or ammonia that is generated and consequently the greater is the damage done to the product by these volatiles.

Fabricators have learned to cope with this problem. The solution however which has evolved is a compromise. Most currently manufactured condensation polymer bonded products have not been processed in such a manner as to result in optimum cure of the polymer. Optimum cure requires relatively high temperatures; economic reality requires short heating cycles. The combination of high temperatures and short heating cycles results in a rapid generation of a large amount of ammonia or water with consequential serious damage to the product. Thus the compromise has been to lower the curing temperature and shorten the time as much as the minimum product standards will allow.

Concern with and efforts to solve the problems created by evolution of volatile by-products goes as far back in time as 1912 as evidenced by the issuance of U.S. Pat. Nos. 1,020,594; 1,046,420; and 1,102,634; all three patents having been issued to J. W. Aylsworth. These patents disclose the use of monomeric organic acid anhydrides as scavengers of the water and ammonia generated by the curing reaction of the two basic types of phenol-formaldehyde condensation polymers. Unfortunately however, such monomeric anhydrides, when used in quantities adequate to react with a substantial amount of the water or ammonia generated, act as plasticizers for the condensation polymer. This results in a large increase in the fluidity of the polymer during the process of curing and detracts from the thermal stability of the final cured polymer. It is probably for this reason that Aylsworth's teachings have not been widely adopted by the fabricators of condensation polymer bonded products.

It is an object of the present invention to provide a process whereby condensation polymers may be cured to their ultimate cross-link density without damage from the generation of gaseous by-products.

It is also an object of the present invention to provide a process for the more rapid curing of condensation polymer bonded products.

It is a further object of the present invention to provide an improved condensation polymer bonded product, said improvement being a direct result of the high cross-link density of the cured polymer and the final product being essentially free of volatile by-products.

It is still a further object to provide a novel composition of matter.

DESCRIPTION OF THE PREFERRED EMBODIMENTS

It has been discovered that compounding with a thermosetting condensation polymer, limited amounts of an essentially non-cross linked polymeric organic acid anhydride and heat treating the mixture to cure the condensation polymer, the condensation reaction by-product thereby generated is chemically removed by the polymeric anhydride without any significant undesirable side effects. Hence the traditional cure cycles for such polymers can be substantially improved upon. For example, a mixture of 90 parts by weight of a two stage hexamethylenetetramine cross linked phenol-formaldehyde prepolymer BRP-5417 manufactured by Union Carbide Corporation, and 10 parts by weight of Gantrez AN-119, a polymeric vinyl ether organic acid anhydride manufactured by General Aniline and Film Corporation, can be cured by plunging a ½ inch thick disc composed of only prepolymer and polymeric anhydride into a curing oven preheated to 150°C without the preform showing any substantial evidence of bloating due to the generation of ammonia gas by the cross-linking reaction of the hexamethylenetetramine with the prepolymer. In the absence of the polymeric anhydride such a resin disc would puff and swell to twice or three times its original thickness resulting in such severe damage as to make the final cured piece essentially useless. When various quantities of filler are added to the prepolymer in the absence of the polymeric anhydride, the severity of gassing is diminished somewhat but is still grossly excessive. The effect of the polymeric acid anhydride then is to allow: (1) the conventional high temperature, long time, cure cycles to be greatly shortened, and (2) the lower temperature short time cycles to be carried out at higher temperatures thereby introducing more cross-links into the polymer system.

When high filler type systems are involved, e.g., 95 parts by weight of aluminum, copper, woodflour, asbestos, or the like, and 5 parts by weight of condensation polymer, the curing conditions usually involve the simultaneous application of temperature and pressure for the purpose of imparting a substantial degree of cure without distortion or other damage occurring in the piece being molded. If the temperature is limited to not more than approximately 150°C and a pressure of not less than about 2,000 p.s.i., the method is reasonably successful. Yet a substantial portion of a product made in this manner would be rejected for warping, cracking, or other defects caused by the evolution of the volatile by-product of the condensation reaction. This problem can be virtually eliminated by incorporating in the filler-condensation polymer mixture, the proper amounts of a polymeric organic acid anhydride. What are proper relative amounts of polymeric anhydride and condensation polymer is dependent on the properties desired in the final product and the processing conditions available. From one to 50 parts by weight of polymeric acid anhydride, to 50 to 99 parts by weight of condensation polymer can be employed to make useful products. The preferable range of anhydride is from one to 25 parts of polymeric anhydride, to 75 to 99 parts by weight of condensation polymer.

The commercial significance of the present invention can be further exemplified when it is applied to the manufacture of phenol-formaldehyde polymer bonded grinding wheels, in that grinding wheels by nature of their end use, require close to the maximum possible cross-link density in the final product. For example, a very widely used grinding wheel is one measuring 9 inches in diameter, ¼ inch thick, and having a ⅞ inch hole in a raised hub. These usually have a glass cloth reinforcement in them, are bonded with a binder material based on a two-stage hexamethylenetetramine cured phenol-formaldehyde polymer, and an abrasive such as aluminum oxide, silicon carbide, aluminum oxide-zirconium oxide, or the like. A typical wheel of this type will have a volume percent composition of:

| | |
|---|---|
| Abrasive | 46% |
| Bond | 36% |
| Porosity | 18% | with the bond having a weight percent composition of:

| | |
|---|---|
| phenol-formaldehyde polymer | 56.4% |
| cryolite | 33.7% |
| calcium oxide | 9.9% |

Heretofore these wheels were manufactured by blending the bond ingredients, mixing the blended bond with abrasive grains which have previously been wetted with a pick up agent like furfuraldehyde, and pressing the thusly prepared mix in a mold at room temperature, having incorporated one or more reinforcing cloth discs therein. These cold formed wheels have been normally subjected to a relatively long heat treatment with the temperature peak of the cycle being generally between 160° and 185°C. To avoid damage to the wheel by rapidly evolving ammonia during heat treatment, said heat treatment must be gradual and therefore relatively prolonged. Usually 20 to 24 hours are required although wheels of relatively high porosity have been cured in as short a time as 4 hours. In either case, the production rate is drastically reduced by the need for such a long cure cycle. By applying the present invention to the manufacture of such wheels, the cure cycle can be reduced from the prior art minimum of approximately 4 hours with a maximum temperature of 185°C, to approximately 4 minutes at a maximum temperature of about 275°C. This is accomplished by modifying the weight percent bond composition as follows:

| | |
|---|---|
| phenol-formaldehyde polymer | 54.0% |
| Gantrez AN-119 | 2.4% |
| calcium oxide | 9.9% |
| cryolite | 33.0% |

The end product manufactured in accordance with the invention has essentially the same grinding characteristics as the conventionally processed wheel despite the modification in the bond. There are apparently few polymeric acid anhydrides commercially available, other than Gantrez AN-119 and its higher molecular weight homologues. However, the skilled organic chemist could synthesize on paper, a large variety of such materials and physically synthesize at least a good number of these. Obviously other vinyl type monomers can be reacted with maleic anhydride to form polymeric anhydrides. In these same syntheses, citraconic acid could be substituted for maleic acid. Polymeric acid anhydrides based on tetracarboxylic acids are also possible.

The mechanism by which the polymeric anhydrides effectively scavenger the volatile by-products of the condensation reaction without resulting the detrimental side effects to the process nor to the final product as do the anhydrides described in Aylsworth's patents cited above, is not completely understood. It has been established that the polymeric anhydride does in fact react with the ammonia, water, or alcohol generated by the condensation reaction thus allowing condensation polymer containing products to be cured faster and at a higher temperature. Why the presence of polymeric anhydride in the final product seems to have no measurable effect on the products properties has not been established. It is believed however, that this phenomenon results at least in part, from reaction between unreacted polymeric anhydride and/or the reaction product of the polymeric anhydride and the condensation reaction by-products, with the condensation polymer itself. Such a co-polymerization of the polymeric anhydride and/or it's reaction products with the condensation polymer would diminish or eliminate the contaminant characteristics of the polymeric anhydride e.g., its ability to function as a plasticizer.

What is claimed is:

1. A method for the rapid molding and curing of relatively thick articles, said articles being comprised of a mixture of from 5 to 99 parts by weight of a thermosetting condensation polymer which upon curing generates a by-product containing a functional radical selected from the group consisting of hydroxyl, amine, and mixtures thereof; and from 0 to 95 parts by weight of filler, including the steps of preparing said mixture, forming said mixture into the desired shape, and curing said condensation polymer by the application of heat, wherein the improvement comprises:
   scavenging the hydroxyl and amine containing by-products of the curing reaction of said condensation polymer by incorporating in said mixture from 1 to 50 parts by weight of an essentially non cross-linked polymer containing at least two organic acid anhydride groups appended therefrom.

2. The method according to claim 1 wherein said filler is a material selected from the group consisting of asbestos, woodflour, chopped fibers, cloth, carbon, silicon carbide, aluminum oxide, aluminum oxide-zirconium oxide, diamond, boron nitride, silica, magnesia spinel-zirconia, magnesia spinel, aluminum, copper, iron, potassium fluoro borate, sodium fluoro aluminate, barium sulfate, calcium oxide, iron sulfide, and mixtures thereof.

3. The method of claim 2 wherein said essentially non cross-linked polymeric anhydride is at least a tetramer of an organic anhydride monomer and a non-anhydride hydrocarbon monomer, said condensation polymer is one selected from the group consisting of phenol-aldehyde, urea-aldeyde, aniline-aldehyde, melamine-aldehyde, polyimide, polybenzimidazole, saturated polyester, and mixtures thereof, and said heating temperature is at least the temperature midway between said melting and decomposition temperatures.

4. The method of claim 3 wherein said condensation polymer is phenol-formaldehyde, said polymeric anhydride is poly (methyl vinyl ether/maleic anhydride), and said heating temperature is between 90° and 275°C.

5. As a new composition of matter, the infusible reaction products formed by the combination under heat of a thermosetting condensation polymer which upon curing generates a by-product containing a functional radical selected from the group consisting of hydroxyl, amine, and mixtures thereof, an essentially non cross-linked polymeric organic acid anhydride containing at least two anhydride groups, and a filler material therefor.

6. The composition of matter of claim 5 wherein said condensation polymer is one selected from the group consisting of phenol-aldehyde, urea-aldehyde, aniline-aldehyde, melamine-aldehyde, polyimide, polybenzimidazole, and mixtures thereof.

7. The composition of matter of claim 6 wherein said filler material is selected from the group consisting of asbestos, woodflour, chopped fibers, cloth, carbon, silicon carbide, aluminum oxide, aluminum oxide-zirconium oxide, diamond, boron nitride, silica, magnesia spinel, aluminum, copper, iron, potassium fluoro borate, sodium fluoro aluminate, barium sulfate, calcium oxide, iron sulfide, and mixtures thereof.

8. The composition of matter of claim 7 wherein said condensation polymer is phenol-formaldehyde and said acid anhydride is poly (methyl vinyl ether/maleic anhydride).

9. An article of manufacture consisting essentially of from 5 to 100 parts by weight of the infusible reaction product formed by the combination under heat of from 2.5 to 99 parts by weight of a thermosetting condensation polymer which upon curing generates a by-product containing a functional radical selected from the group consisting of hydroxyl, amine, and mixtures thereof with 0.05 to 50 parts by weight of an essentially non cross-linked polymeric acid anhydride containing at least two anhydride groups, and from 0 to 95 parts by weight of a filler material.

10. The article of manufacture of claim 9 wherein said condensation polymer is one selected from the group consisting of phenol-aldehyde, urea-aldehyde, aniline-aldhyde, melamine-aldehyde, polyimide, polybenzimidazole, and mixtures thereof.

11. The article of manufacture of claim 9 wherein said filler material is selected from the group consisting of asbestos, woodflour, chopped and milled fibers, cloth, carbon, silicon carbide, aluminum oxide, aluminum oxide-zirconium oxide, diamond, boron nitride, silica, and magnesia spinel zirconia, magnesia spinel, aluminum, copper, iron, potassium fluoro borate, sodium fluoro aluminate, barium sulfate, iron sulfide, calcium oxide, and mixtures thereof.

12. The article of claim 11 wherein said article is a grinding wheel comprised of from 5 to 25 parts by weight of said infusible reaction product and 75 to 95 parts by weight of filler material, said filler material being an abrasive selected from the group consisting of silicon carbide, aluminum oxide, magnesia spinel, magnesia spinel-zirconium oxide, aluminum oxide-zirconium oxide, diamond, boron nitride, and mixtures thereof.

13. The grinding wheel of claim 12 wherein said condensation polymer is phenol-formaldehyde and said polymeric acid anhydride is poly (methyl vinyl ether/maleic anhydride).

* * * * *